United States Patent
Jones et al.

(10) Patent No.: US 6,622,176 B2
(45) Date of Patent: *Sep. 16, 2003

(54) INTERFACE DEVICE AND METHOD

(75) Inventors: Colin Jones, Dartford (GB); Mandeep Singh Dhaliwal, Ilford (GB); Peter Kennedy, Maidstone (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/732,319

(22) PCT Filed: Apr. 19, 1995

(86) PCT No.: PCT/GB95/00881

§ 371 (c)(1),
(2), (4) Date: Oct. 21, 1996

(87) PCT Pub. No.: WO95/29440

PCT Pub. Date: Nov. 2, 1995

(65) Prior Publication Data

US 2002/0004853 A1 Jan. 10, 2002

(30) Foreign Application Priority Data

Apr. 21, 1994 (EP) .............................................. 94302863

(51) Int. Cl.[7] ................................................. G06F 9/46

(52) U.S. Cl. ..................................................... 709/328

(58) Field of Search ................................ 395/682, 681, 395/680, 500; 707/10, 4; 345/968; 709/302, 300, 310, 328, 313

(56) References Cited

U.S. PATENT DOCUMENTS

| | | | | |
|---|---|---|---|---|
| 4,709,328 A | * | 11/1987 | Anthony, Jr. et al. | 364/200 |
| 4,774,661 A | * | 9/1988 | Kumpati | 364/300 |
| 4,791,558 A | * | 12/1988 | Chaitin et al. | 364/200 |
| 5,036,484 A | * | 7/1991 | McCoy et al. | 364/900 |

(List continued on next page.)

FOREIGN PATENT DOCUMENTS

EP 0394614 * 10/1990

OTHER PUBLICATIONS

IBM TDB, "System for Accessing a Mainframe from a Workstation User Interface", vol. 32, No. 4A, pp. 290–292, Sep. 1989.*
IBM TDB, "Method to Provide Mainframe Applicaiton with Interactive Scrolling on a Workstation", vol. 32, No. 4A, pp. 277–282, Sep. 1989.*
CCL: A Portable and Tunable Collective Communication Library for Scalable Parallel Computers, IEEE, Apr., 1994, pp. 835–844.*
IBM Technical Disclosure Bulletin, vol. 33, No. 2, Jul. 1990, New York US, pp. 99–100, "Device–Independent Support in Communication Environments".

*Primary Examiner*—Sue Lao
(74) *Attorney, Agent, or Firm*—Nixon & Vanderhye P.C.

(57) ABSTRACT

An interface device, for use in a data management system, interfaces between a plurality of application programs, each requiring a device dependent message to run a transaction, and a client device capable of requesting a transaction to be run. The interface device receives device independent messages, from a client device, each containing a keyword, and translates these into device dependent messages which are sent to application programs. The device dependent message returned from the application program is translated by the interface into a device independent message before being sent to the client device.

12 Claims, 3 Drawing Sheets

U.S. PATENT DOCUMENTS

| | | | | |
|---|---|---|---|---|
| 5,058,000 A | * | 10/1991 | Cox et al. | 364/200 |
| 5,179,660 A | * | 1/1993 | Devany et al. | 395/200 |
| 5,187,787 A | * | 2/1993 | Skeen et al. | 395/600 |
| 5,212,792 A | * | 5/1993 | Gerety et al. | 395/650 |
| 5,235,701 A | * | 8/1993 | Ohler et al. | 395/600 |
| 5,261,079 A | * | 11/1993 | Celi, Jr. | 395/500 |
| 5,339,434 A | * | 8/1994 | Rusis | 395/700 |
| 5,361,344 A | * | 11/1994 | Beardsley et al. | 395/500 |
| 5,406,557 A | * | 4/1995 | Baudoin | 370/61 |
| 5,414,762 A | * | 5/1995 | Flisik et al. | 379/198 |
| 5,423,022 A | * | 6/1995 | Ackley | 395/500 |
| 5,437,024 A | * | 7/1995 | French | 395/600 |
| 5,572,711 A | * | 11/1996 | Hirsch et al. | 395/500 |
| 5,594,792 A | * | 1/1997 | Chouraki et al. | 379/269 |
| 5,627,997 A | * | 5/1997 | Pearson et al. | 395/500 |
| 5,634,053 A | * | 5/1997 | Noble et al. | 395/604 |
| 5,758,125 A | * | 5/1998 | Misinai et al. | 395/500 |
| 5,761,494 A | * | 6/1998 | Smedley et al. | 395/604 |
| 5,761,656 A | * | 6/1998 | Ben-Shachar | 704/4 |
| 5,914,713 A | * | 6/1999 | Nario et al. | 345/335 |
| 6,052,685 A | * | 4/2000 | Eastwick et al. | 707/10 |

* cited by examiner

INTERFACE DEVICE AND METHOD

BACKGROUND OF THE INVENTION

1. Field of the Invention

The present invention relates to an interface device for, and to a method for interfacing between a plurality of application programs of a data management system, each application program requiring a device dependent message to run a transaction, and a client device capable of requesting a transaction to be run.

2. Related Art

Large computer systems represent a significant financial investment for the companies which have developed them. Often the cost of developing the software utilised by these computer systems is far greater than the cost of the hardware, and for this reason while the hardware is often upgraded or replaced, the software continues to be used, and is often reused in other computer systems, for many years. A large computer system, for example a system for accessing a database, typically includes software in the form of a number of application programs, which reside on a central mainframe computer, and many client devices, or terminals, which are remote from the mainframe and which are employed by users of the computer system to request information from the database. The application programs perform a number of functions, for example they may specify the dialogue with the client device, access the database (typically via a database management system) and apply certain business rules, e.g. specifying that a customer appointment can only be made once a customer order has been taken, that only certain products are available, etc. There are generally a large number of application programs, each of which performs a specific transaction in relation to the data stored on the database, for example accessing a particular account, placing an order, giving details of equipment at specific locations, billing enquiries, etc. The application programs on large computer systems may comprise millions of lines of software code, and thus represent a significant investment. The application programs are generally designed to be modular, and are often reused for example with different databases.

Many application programs written in the 1980s were designed to be accessed by so called "dumb" terminals, and thus were designed to receive, and to output, a device dependent datastream. A dumb terminal requires that the information sent to it includes hardware controls which are specific to the particular device employed as the dumb terminal, and which specify the manner in which any information sent to the dumb terminal is to be displayed.

With the advent of low cost personal computers (PC) many users of large computer systems utilise a PC as the client device to gain access to the mainframe computer. This can be achieved by running software on the PC which emulates a dumb terminal. Furthermore, users of PCs, or any other intelligent client device, wish to use the intelligence of their terminals to access, and manipulate the data stored by the mainframe computer in a more flexible manner than is possible with a dumb terminal.

A known technique for achieving this is "screen scraping", also known as "face lifting". Screen scraping techniques employ a dumb terminal emulator, but rather than requiring interaction with the user, a further program is run on the PC which automatically drives the dialogue with the mainframe computer, via the dumb terminal emulator, without requiring interaction with the user. Once the required data from the mainframe has been received at the PC, the data can be combined and displayed in any format chosen by the user, rather than being restricted to the screen format dictated by the mainframe computer. PC users are thus able to specify a more modern, user friendly screen interface. Furthermore the screen scraping software on the PC can be programd to acquire data from a number of formatted dumb terminal screens output by the mainframe computer, and to display this data on a single screen. For example, if the computer system comprises the customer database for a telephone operator, the telephone number of a customer input to the screen scraping program on the PC could be used to acquire a profile of the customer i.e. his address, the telephone equipment he has installed, the date of his last bill, etc. Thus the PC user can decide on new functionality that he requires from the large computer system, and achieve this functionality, by programming screen scraping software local to the PC, far more rapidly than the new functionality could be achieved by reprogramming the large application programs resident on the mainframe computer. Such screen scraping software can be purchased, for example from Attachmate Corporation (Attachmate Sales UK Ltd, Attachmate House, 102 Markham Mews, Broad Street, Wokingham, Berkshire, RG111AH) who sell screen scraping software products called "Extra!" and "Extra! for Windows".

Although screen scraping rapidly solves the PC users immediate requirements, a number of severe problems for the computer system as a whole are created. Since the screen scraping software relies on having intimate knowledge of the device dependent datastream output by the application programs, i.e. it needs to know precisely where particular items of data appear in the formatted screens sent by the application programs, any change which is made to the application programs which affects their output will affect the operation of the screen scraping software. Thus whenever a development is made to an application program all the screen scraping software on all the intelligent client devices served by the mainframe computer will need to be altered, at the same time. This severe configuration management problem may mean that there is pressure from the PC users for the application programs not to be improved or updated, so as to become out of step with their screen scraping facilities. This results in the front end PC clients constraining development of the backend mainframe.

A further problem is created due to the ease with which many transactions may be requested via screen scraping software by the PC client of the mainframe application programs. Since these transactions are run serially by the PC client, the response time at the PC is adversely affected, and the network traffic between the PC and the mainframe is increased substantially. Furthermore, use of screen scraping by a significant number of PC clients may cause degradation in the performance of the mainframe computer, which was designed and tuned to deal with the work rates of a user interacting with a dumb terminal client.

SUMMARY OF THE INVENTION

According to a first aspect of the present invention there is provided an interface device for interfacing between a plurality of application programs of a data management system, each application program requiring a device dependent message to run a transaction, and a client device capable of requesting a transaction to be run, the interface device comprising:

first input means for receiving a device independent message containing a keyword from the client device, first output means for sending a device dependent message to an application program, second input means for receiving a device dependent message from an application program, second output means for sending a device independent message to the client device, memory means for storing keywords, data identifying the transaction(s) to which each of the keywords relates, and the device dependent messages required to run each of the transactions, and processing means for extracting the keyword(s) from a message received by the first input means, accessing the memory means to determine the device dependent message(s) associated with the keyword(s), sending said device dependent message(s) via the first output means to the application program(s), extracting data from a message received by the second input means, and sending said data within a device independent message to the client device via the second output means.

Thus, embodiments of the present invention, by providing an interface device which facilitates the translation of a device independent message from the client device, to a device dependent message as expected by the application program, and vice versa, allow the client device to be isolated from the precise requirements of the applications program.

A PC client making a request of a data management system comprising an interface device according to the present invention thus does not need to know, for example the screen co-ordinates required by the particular application program to run a particular transaction. The PC client simply needs to identify the relevant transaction, and data required, via the keyword sent in a device independent message to the interface device. The interface device will then relate the keyword sent to the device dependent message required to run a particular transaction via the application program. If the application program is altered so that it requires a different device dependent message, or so that it outputs the results of a transaction in a different format, only the appropriate device dependent message stored within the memory means of the interface device need be altered. The PC client can continue to access the same application program in the same manner via the same keyword, so that as improvements are made to application programs no changes are required to the many PC clients.

Preferably a single keyword may be associated with more than one device dependent message within the memory means of the interface device. This allows a single request from a client device to cause the interface device to run a number of transactions, and to return information from a plurality of formatted screens output by the application program(s) to the client device via a device independent message. Thus compared to screen scraping techniques multiple serial communications between the client device and the application program(s) have been replaced by a single communication. The response times experienced by a user at the client device are thus greatly improved, and the network traffic between the client device and the central computing resource is greatly reduced.

Preferably a data management system comprising a central computing resource having an interface device according to the present invention also comprises a dialogue manager for receiving requests for transactions from client devices, which dialogue manager is able to distinguish between device independent messages, and device dependent messages, and to pass device independent messages to the interface device. This allows the data management system to support both dumb terminals communicating with the central computing resource via device dependent datastreams, and intelligent client devices communicating with the central computing resource via device independent messages.

According to a second aspect of the present invention there is provided a method for interfacing between a plurality of application programs of a data management system, each application program requiring a device dependent message to run a transaction, and a client device, the method comprising the steps of:

i) receiving from the client device a device independent message containing a keyword, ii) comparing the keyword from the device independent message with stored keywords, each of which is associated with one or more stored device dependent messages, to find a matching keyword, iii) sending the device dependent message or messages associated with the stored matching keyword to the application program(s), iv) receiving from one or more application programs a device dependent message, which contains data retrieved as a result of a transaction, v) extracting data in accordance to the keyword(s) from the device dependent message, and vi) sending the extracted data within a device independent message to the client device.

BRIEF DESCRIPTION OF THE DRAWINGS

Embodiments of the present invention will now be described, by way of example only, and with reference to the accompanying figures, in which.

DETAILED DESCRIPTION OF EXEMPLARY EMBODIMENTS

The embodiment of the present invention to be described comprises a large data management system which includes an interface device, according to the present invention, which in the present embodiment is termed MMBI (middleware message based interface). The data management system comprises hardware and software. The hardware components are IBM 3090 series mainframes. Standard IBM software is utilised for the operating system (MVS), and the teleprocessing monitor (CICS), and the database management system is IDMS, sold by Computer Associates of Computer Associates House, 183–187 Bath Road, Slough, Berkshire, SL1 4AA. The IBM hardware and software components can be purchased from IBM UK Ltd, PO BOX 41, North Harbour, Portsmouth, PO63AU. The system furthermore comprises a number of software modules collectively known as middleware. Middleware is a term known in the software field to describe a layer of software which is positioned between application programs, which are written for the specific requirements of the operator of the computer system, and the proprietary software purchased by the operator of the computer system. A key role of middleware is to insulate the application programs from the demands of the teleprocessing monitor, i.e. IBM's CICS. CICS is a complex piece-of software produced by IBM which is regularly updated. By using middleware the application programers need know very little about CICS, since they can rely on the middleware programers to deal with the complexities of interfacing with CICS, and to incorporate any changes necessary due to new versions of CICS. Middleware also allows many routine functions such as sign-on, menu, validation and abends to be handled centrally rather than being reproduced in each of the application programs.

Figure 1:
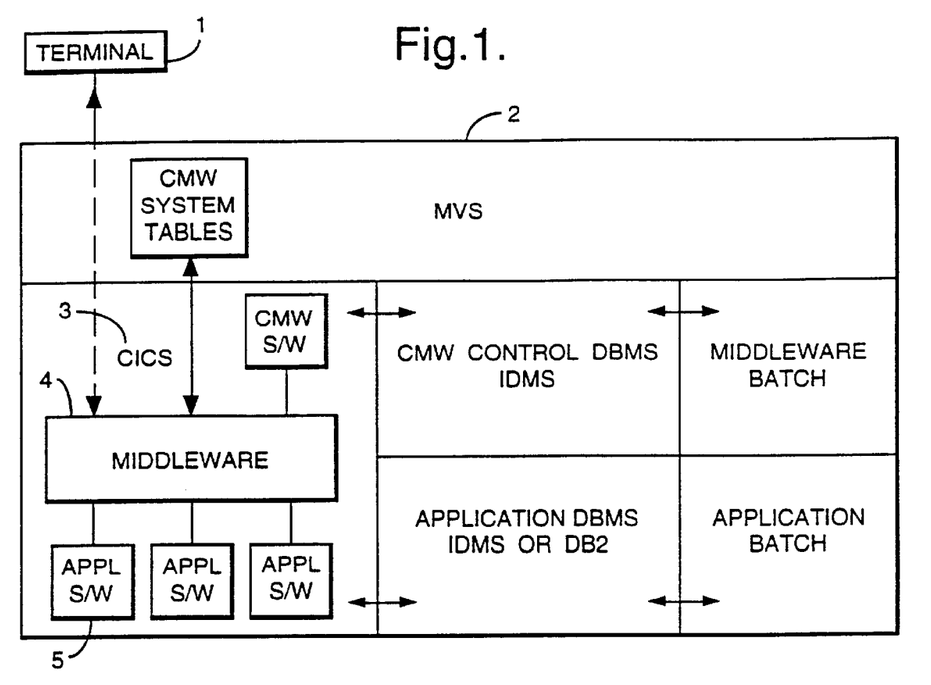
FIG. 1 is a schematic diagram of a data management system according to the present invention.
Figure 2:
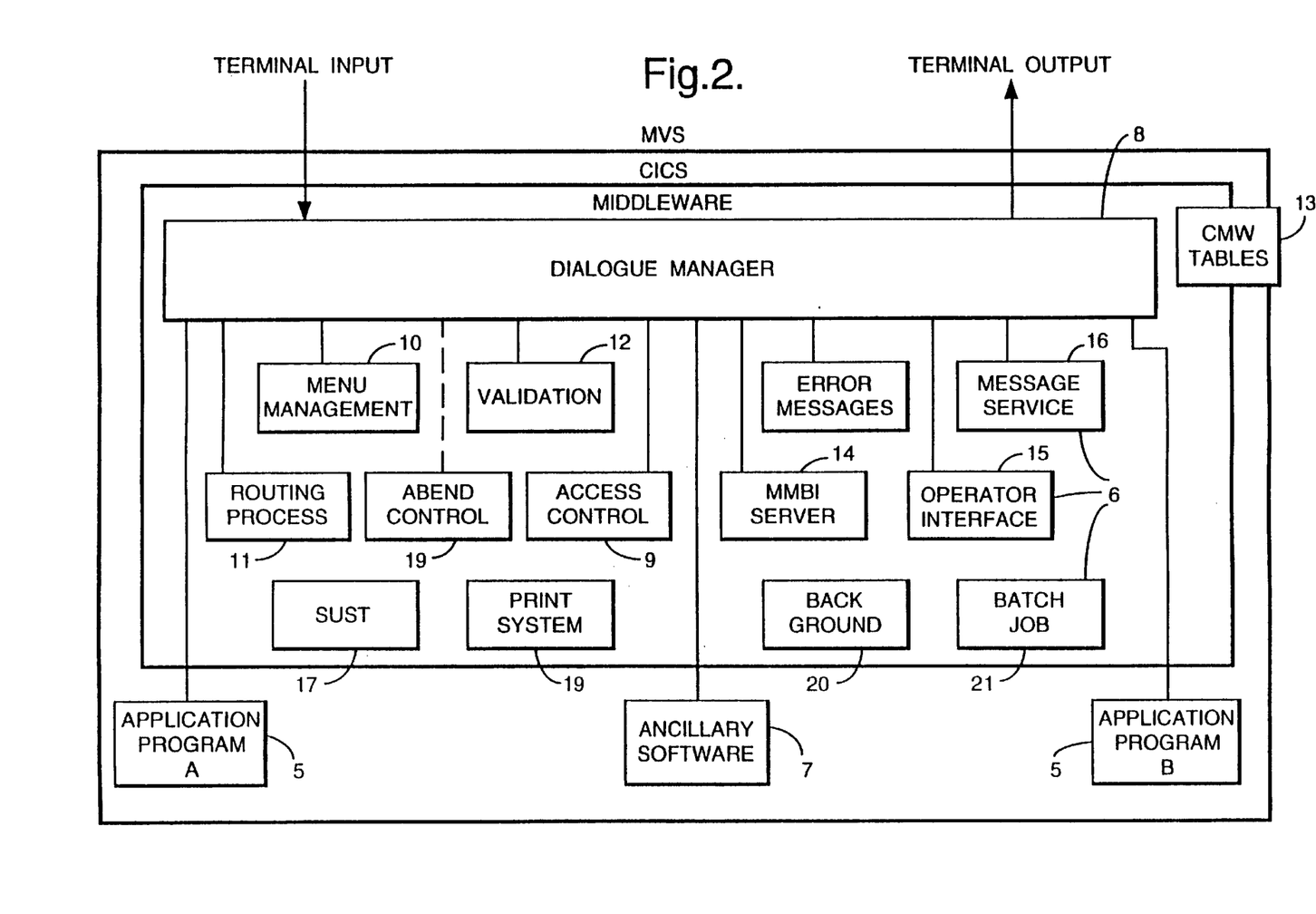
FIG. 2 is a schematic diagram showing in greater detail the middleware components of the data management system of FIG. 1.

FIGS. 1 and 2 show schematic diagrams of the software of the data management system.

All input from terminals 1 is passed, via MVS 2, to CICS 3 which in turn passes it to middleware 4. Middleware 4 performs certain functions on the data, such as access control and validation, before passing it on to the appropriate application program 5. Data is returned to the terminal back via middleware 4, CICS 3 and MVS 2.

An integral part of middleware 4 are middleware tables 13. These tables 13 hold reference data that describes the configuration of the on-line system. While the system is running these tables are held within the machine's memory which belongs to MVS (the MVS private storage area associated with the CICS address space). The data for the tables 13 is held in a middleware database. This data is then used to build linear datasets (LDS) which are loaded into memory when the system is started. The data is entered and maintained in the middleware database by middleware ancillary software 7.

Most application programs 5 are controlled by middleware. A few are allowed to run in the CICS environment outside the control of middleware. In general application programs 5 do not use the services provided by CICS except temporary storage queues (TSQ) and program control. Middleware is made up of a number of different components which are shown in FIG. 2.

A description, with reference to FIG. 2, of each middleware component follows.

Middleware Tables

Each of the middleware components 6 accesses one or more of the middleware tables 13. Using ancillary software 7, the system can be reconfigured by adding and changing certain elements in the tables. Any changes made to the tables do not immediately become effective. The tables are loaded into the machine's memory during system start-up and thus changes do not become effective until the tables are reloaded, i.e. when the LDSs are next rebuilt and refreshed or the CICS system is restarted.

Dialogue Manager

Dialogue manager 8 is the main middleware component. Each time a terminal sends data, dialogue manager 8 is executed. Dialogue manager 8 controls the processing of the input, calling the various middleware components and application programs 5 as necessary. After the application program 5 has finished processing the data, dialogue manager 8 takes control of processing any output messages.

Access Control

Access control 9 is the main middleware security feature. Before the on-line system can be used the user must 'sign on'. Once a user has 'signed on' access control determines whether the user can access a particular transaction or application according to:
  1. The user profile their user ID is in.
  2. The terminal group their terminal is in (note that access control based on terminal group can be configured off).

Menu Management

Middleware developed systems are menu driven. When a user 'signs on', the primary menu is displayed. This menu is built by menu management 10 and it only shows the applications that the user is allowed to use. If the user selects a particular application, menu management 10 builds an application menu showing only the transactions, belonging to the selected application, that the user can access.

Routing Process

'Routing' is a process 11 used in transaction switching. Its function is to examine screen input data (telephone number, account number, or address data), and identify the system where the transaction should run with that data. In order to do this it uses routing tables to 'look up' the incoming data and associate it with a system. There are five routing tables:
  1. Telephone
  2. Account number
  3. Postcode
  4. Posttown
  5. Locality In addition, there is the county table which is not used for routing but to supplement the data contained within the posttown table for use with enhanced routing.

Validation

Validation 12 is a large part of the processing of any terminal input. Within the middleware tables 13 there is a set of tables that specify the basic validation that is to be performed on every field on every screen. Before the terminal input is passed to the application program 5, validation 12 validates each field on the screen according to the rules specified in the tables 13.

The types of validation that are performed are for format, ranges and specific values. There are no validation checks against the application database or field interdependency checks. These are the responsibility of the application programs 5.

If any of the fields fails the validation, the current screen is redisplayed to the user with an appropriate error message. The data is not passed to the application program 5.

MMBI (Middleware Message-Based Interface) Server

MMBI 14 allows an intelligent front-end system (e.g. PC client) to invoke back-end system functions via self-defining type/length/value (TLV) messages.

The MMBI server 14 logically acts as an agent between the front-end client and dialogue manager 8 (which runs standard screen-based business transaction). It allows one or more transactions to be executed under the control of an object script language. The MMBI 14 introduces new middleware systems tables 13, themselves supported by new linear datasets.

Any middleware or business function can be executed using a self-defining datastream message rather than the classic CICS screen presentation. The message, for both input and output, is in a type, length and value (TLV) format.

The MMBI server 14 processes the message, controls transaction execution (via requests to dialogue manager) and finally returns the resulting output in a self defining format.

Error Messages

Every error message output on a user's screen is allocated a unique id. The text associated with each message is stored in one of the middleware tables 13. When middleware, e.g. validation, or an application program wishes to display a message to the user they only supply the unique id to dialogue manager. The message is displayed, by dialogue manager 8, using the text in the middleware table. Operator Interface.

With the inherent complexity of middleware developed systems, there is a need for sites to be able to monitor and control the teleprocessing environment, an operator interface 15 is thus provided. With this interface 15 the user can monitor all messages produced by the system and monitor and control items such as:

Users signed on

Terminals

Printers

Background schedulers

Message Service

Message service 16 is used to pass data between systems that need to communicate whilst performing transaction switching. There are two sides to message services:

Local message service (LMS)—the process used in the user's home system to send and receive data to/from the remote system.

Remote message services (RMS)—the process used in the remote system to receive and send data to/from the home system.

Systems Statistics (SUST) 17

Collects system statistics for later analysis. Can be stopped or started using the operator interface 15.

Report Printing (RP) Subsystem

Though CICS provides the ability to use remote printers, the standard facilities provided are not very sophisticated. The report printing subsystem 18 allows an application to generate a report into the middleware database from which the printing function within middleware controls the actual printing of the report.

The subsystem runs in CICS, but in the background. It is started when the CICS system is brought up and it is controlled through the operator interface 15 rather than dialogue manager 8.

Abend Control

As middleware provides its own environment it is important that any failures do not cause the user to drop out of that environment and into native CICS. This could potentially give the user confusing results.

Abend control 19 takes control in the event of any failure. It displays an abend screen giving relevant information which the user can print and pass on to the support staff. Once the user has processed the abend screen the user may continue (exceptionally, the user may be forced off).

Background Scheduler

Within any system there are a number of functions that need to be executed straight away, i.e. as the result of terminal input, but are fairly heavy users of resources. If these functions are executed from a terminal the terminal would be unusable for an unacceptable amount of time. The background scheduler 20 facilitates these functions. It controls the functions as they execute in CICS background. The scheduler 20 is controlled by the operator interface 15.

Generally a transaction running from a terminal submits data to the background scheduler 20 for processing. It is left up to each application to determine whether or not the dat has been processed.

Batch Job Submission

The batch job submission part of middleware 21 allows an application program 5 to submit a job to JES (Job Entry subsystem) the user can then monitor the jobs progress through the system. A typical use of this facility is for an application transaction to submit a batch job to create a report into the report printing subsystem 18. Once the user has found the job has finished, by using a middleware transaction, the report can be browsed online using the report printing subsystem 18.

Ancillary Software

The reference data that is loaded into the middleware tables 13 is held in the middleware database. The ancillary software transactions are used to create and maintain this data.

Screen-Related Tables

Middleware relies on a large amount of reference data to provide the required functions. This reference data describes the components of the on-line system and certain control information.

The data for the tables is held in the middleware database. To reduce the overhead of accessing the data it is loaded into the machine's memory. There are two types of tables residing in the MVS private storage area; static tables (protected against update) and dynamic tables (unprotected for update).

The tables are loaded as part of the CICS STARTUP process, or during an inflight tables reload. The data is loaded from linear datasets (LDS) into the MVS private storage area. A Database Control Table (DBCT) for middleware contains information about whether the particular LDS data is static or dynamic.

Other tables are read from sequential files via CICS transient data queues.

The address of each table loaded is stored in the CICS CWA (Common Work Area).

Once loaded, the static tables cannot are modified. The details in the dynamic tables can be, and are, modified by the system but no new elements can be added. The SIGNON_ MESSAGE and BROADCAST tables are loaded with empty records which are updated during the CICS run.

Static Tables

The static tables are split into several parts as follows:

Screen-related

Access-related

Transaction switching-related

Configuration-related

MMBI-related

Screen-Related Tables

Validation Tables

One of the middleware functions is to perform basic validation on all application screens. To do this middleware needs to know the details of every application screen, i.e. field locations, sizes and validation rules.

The screen details are generated into the middleware database when a screen is created as part of the application development. When the load module for a screen is sent out to a site, the screen details are also sent. The details are loaded into the site's database as part of the configuration management system.

Figure 3:
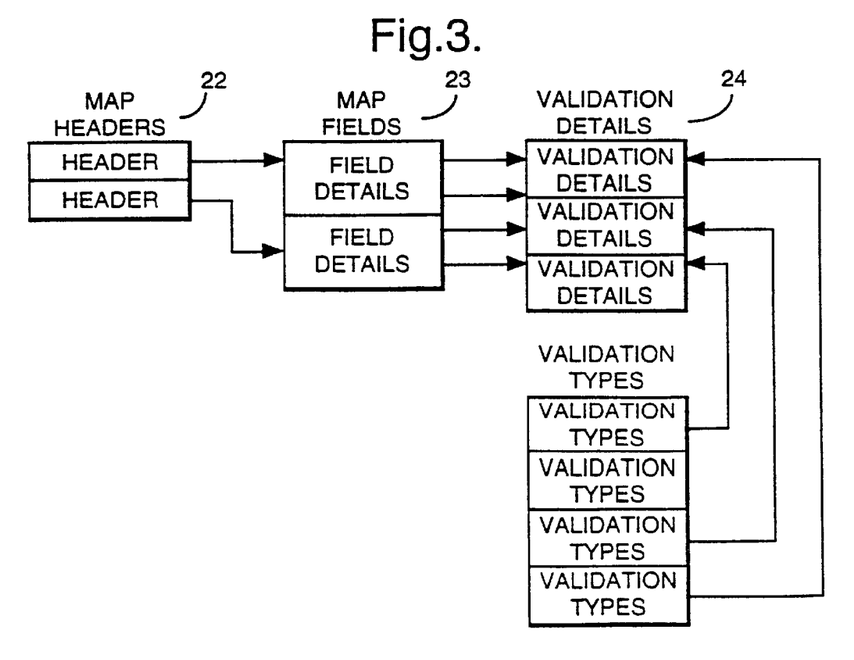
FIG. 3 is a schematic diagram of the screen-related static tables employed in a data management system according to an embodiment of the present invention.

The screen details are loaded into four tables as shown in FIG. 3.

The purpose of each table is as follows:

| | |
|---|---|
| Map Headers 22 | Contains the name of every screen in the system. It is used to find the field details for each screen. |
| Map Fields 23 | Contains the definitions of each field on every screen. It defines the start position, length and validation type of each field. If the validation type is a range check it also contains the lower and upper limits of the range. |
| Validation Values Ids | When a field is to be validated against a specific value or list of values the value or list is assigned an ID. Any particular ID can be reference by more than one field. This table contains all valid IDs. |
| Validation Values | For each valid ID in the validation type table this table contains the specific value or list of values. |
| New Maps/Program Tables | The new maps/programs table is used by the tables load manager during the inflight reload to determine which new maps have been introduced since the last system startup. This list of maps and their associated programs is used to drive an automatic CICS new copy which is synchronised with the introduction of the new versions of a map mask and any validation table information. |

The validation types tables is not used during normal processing. Its purposes is to provide a link to the validation details table when the tables are loaded. After the table load the table is not used.

Operation of MMBI

To gain access to the MMBI the client only needs normal terminal access to the middleware system.

Once connected the client signs on by normal screen scraping techniques from the middleware sign-on screen.

If immediate MMBI access is required then the transaction identity 'MMBI' is entered on the sign-on screen. Otherwise the transaction can be used at any time during the signed-on session.

Invoking this transaction identifies the client as an MMBI device and the terminal session is switched from formatted screens into free form text.

All subsequent communication is made using valid MMBI messages. The client's order of communication will always be:

Send request message
Wait for response
Process MMBI response
Send request message
Etc.

Within the allowed set of MMBI requests there is one that the clients can use to switch back to formatted screen mode when necessary. Once there, transaction 'MMBI' would be used to again switch into MMBI mode.

MMBI Objects

In addition to standard transactions, MMBI objects can be executed.

An object allows the client to pre-define a group of one or more transactions to be run in sequence. The definition is written using a MMBI script language. The definitions of all objects are loaded into the object table at startup and accessed from there whenever one is executed.

The language can define:

A sequence of transactions (with or without parameters) to be run (EXEC command).

Conditional logic based on resultant screen id (ON-EVENT command).

Conditional logic based on data values (IF command).

Extraction of certain data (EXTRACT command)

Once the object has completed execution, the response message to the client only contains the data specified by the EXTRACT commands. For example an object running 10 transactions may only return 5 data values out of the possible hundreds available from the transactions.

Setting values of data fields on screens and internal variables (SET command).

MMBI Mapview Table

When receiving or sending a message in MMBI mode middleware needs to know the details of all the application screens currently supported by the MMBI facility. These details include the field's standard name, location and size. For one screen the details are collective known as a mapview.

The mapview are generated into the middleware database when one of the MMBI supported screens is created or modified as part of the application development. When the load module for a screen is sent out to a site, the screen details are also sent.

The screen details are loaded into two tables, with a relationship similar to that of the map headers and map fields tables of FIG. 3.

The purpose of each table is as follows:

| | |
|---|---|
| Mapview Headers | Contains the name of every MMBI supported screen. It is used to find the mapview field details for each screen. |
| Mapview Field Table | Contains the definitions of each field on all the MMBI supported screens. It defines the start position, length and standard name (actually the numeric identify of the name in the standard name dictionary) of each field. |

MMBI-Related Tables

The standard name dictionary table is used to verify all MMBI messages.

The object table is used to execute supported objects when requested by the client. It is actually two tables, the header and detail tables.

The contents of the tables are:

| | |
|---|---|
| Standard name dictionary | Contains all the standard names which are supported by MMBI. Each entry contains a unique numeric subscript used in both the mapview table and the object table to identify the name. |
| Object header table | Contains all the objects which are supported by MMBI. Each entry contains one or more events to be handled by the object. Each event points into the details table, defining the |

| | |
|---|---|
| Object detail table | object language statement(s) to be executed for that event. Contains all the statements needed to service all the events of all the objects in the header table. |

MMBI (Middleware Message-Based Interface) Server

Figure 4:
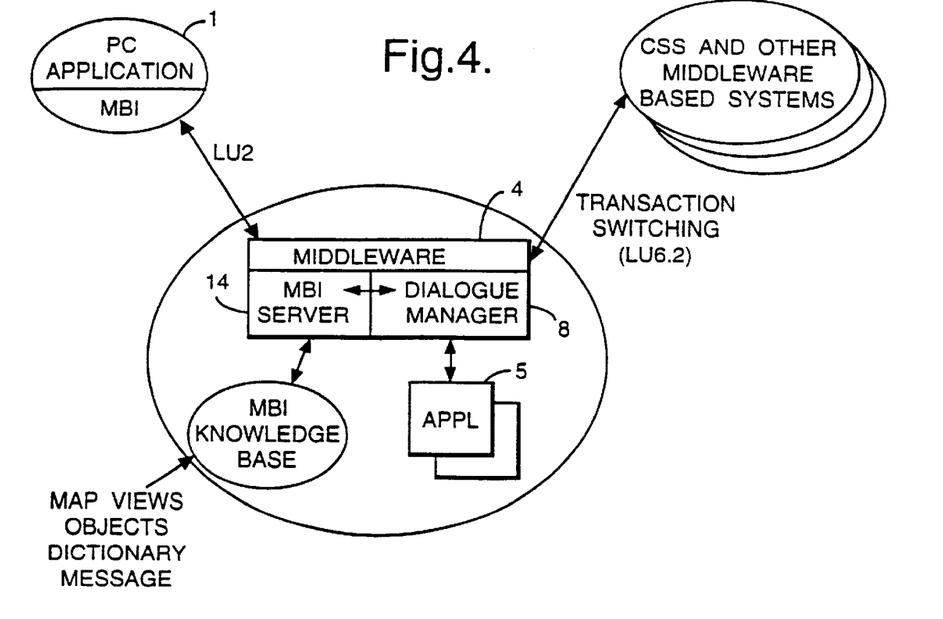
FIG. 4 is a schematic diagram of an embodiment of the present invention showing the relationship between the components of the data management system.

The MMBI server 14 is invoked when a request for function or data is made via the message-based interface to middleware.

Communication across the interface is made by a self-defining message using the type/length/value (TLV) notation. The contents of the message allow any client process (e.g. PC) to make requests to and receive data from the server process (middleware system).

MMBI Message Format

The key rule of the syntax for both input and output is that apart from the first five characters (MMBI and one blank) the entire message is in TLV format, separated by delimiters. This implementation of a TLV format is:

| | |
|---|---|
| tttttttt;1111;vvvvvvvv; | |
| where tttttttt | a meaningful name for the data item (max 31 chars) |
| ; | the delimiter, separating all message elements |
| 1111 | the actual length of data sent (max 4 digits) |
| vvvvvvvv | the data value itself (max 9999 chars) |

The format of the message is:—
MMBI 'control-TVL'; 'control-TLV'; . . . ; CTL-END; 1; *; 'data-TLV'; 'data-TLV'; . . . ; END; 1; *;

| | |
|---|---|
| where MMBI | is a process identifier. The actual TLV message starts on the sixth character. |
| control-TLV | is a series of control word values that request and report on actions and control the flow of data e.g. "RUN-TRNSN; 3; DCA;" |
| data-TLV | is a series of TLV items that define the data. These can be key data needed to run a MW processor the data returned by a process. |
| END; 1; *; | denotes the end of the message, both client and server knows there is no more data to process after this point. |

Example of a message sent by a client process requesting transaction DCA to be run with account number 10000000.
MMBI RUN-TRNSN; 3; DCA; CTL-ND; 1; *; PARM; 8;10000000; END; 1; *;

MMBI Server MMBI Functions

The server's 14 invocation and operation will now be described, with reference to FIG. 4.

When the client is in normal screen mode

The client process requests a switch from normal screen operation to MMBI mode.

All the context data for the client is available to transactions running in MMBI mode. The server 14 is invoked and it prepares the initial message acknowledging that the switch is complete. The middleware system is now operating in MMBI mode for that user (client).

When the client is in MMBI mode dialogue manager 8 invokes the server 14 and passes the data it has received over to the server 14. The server 14 decodes the message and operates thus:—

Either

The client has requested one of the MMBI supported functions (e.g. run process, function keys, overflow data etc.). When executing processes a standard transaction or an MMBI object can be requested.

1. The data items sent in the message are converted into a standard screen. To do this the server uses two of the MMBI tables.

a. Standard Name Dictionary Table

This contains all the names for data items supported by the server. Each name in the input message is searched for in the table.

b. Mapview Table

This contains all the maps (screens) of all the transactions supported by the server. For each map the numeric identities for all of its standard names are listed (collectively called a 'mapview').

A virtual screen (as expected by the application program) is built using the relationship between the message elements and the positional information contained in the mapview and standard name dictionary.

If an object was requested the server accesses the third table, the object table, which contains all the supported objects. For each object the transaction to be executed, data to be extracted and logic control within the object are listed.

2. The virtual screen is passed to-20 dialogue manager 8 along with the transaction details, function key data etc.

3. Dialogue manager 8 then executes the underlying application code just as if it had been requested by a normal screen user.

4. Once the transaction is complete (if an object was requested steps 1, 2 and 3 above will be repeated for each transaction) the virtual screen (result) is passed to the server 14.

5. The output data is converted into the TLV format and returned to the client.

Or

The client wants to be switched from MMBI mode to normal screen operation.

All the context data for the client is available to screen-mode processing. Depending on the request made the server will either request dialogue manager 8 to send the primary menu or initiate a transaction and allow dialogue manager 8 to handle the screen output.

Example of MMBI Object

Figure 5:
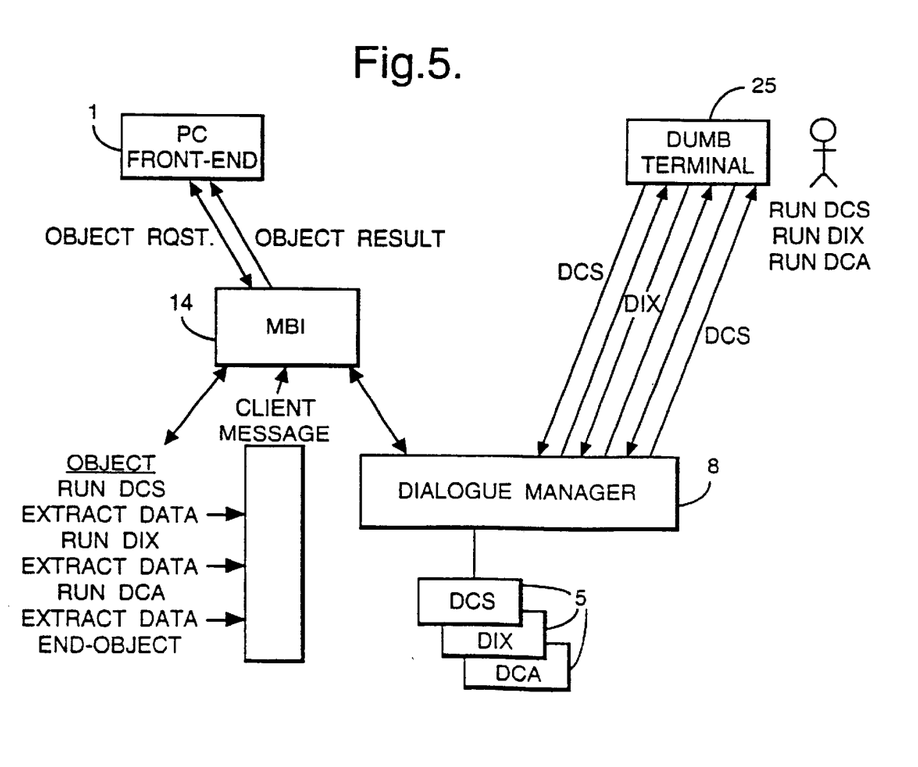
FIG. 5 is a schematic diagram showing an example of multiple transactions run on a data management system according to an embodiment of the present invention, and according to a prior art technique.

FIG. 5 is illustrative of how an MMBI object, containing multiple transactions, would run a set of transactions by employing a single request from a PC client 1, and a single response from the MMBI server 14. Also shown in FIG. 5 is the manner in which a dumb terminal 25 would invoke the same set of transactions. It can be seen that for each transaction required a pair of device dependent messages must be exchanged between the dumb terminal 25 and the dialogue manager 8.

A specific example of the device independent messages exchanged between a PC client 1 and the MMBI server 14, when the MMBI object CRSS01 is requested will now be given.

The object CRSS01 contains the transactions DCS (Display Customer Summary), DCA (Display Customer Account), DCRD (Display Customer Rental Details), DMU (Display Metered Usage) and DIX (Display Invoice).

The PC client issues:

MMBI RUN-OBJECT; 6; CRSS01; TKN-ID; 6; 123456; CTL-END; *; PARM; 10; 0375814881; END; 1; *;

The MMBI server returns:

(The CRSS01 object results in a return of only a subset of the data contained in its constituent transaction). MMBI OBJECT-RSLT; 6; CRSS01; TKN-ECHO; 6; 123456; STS; 2; OK; OBJECT-VER; 4; 0001; CTL-END; 1; *; CUST-NM(01); 16; JONES & HILT PLC; CUST-ADDR (01); 14; 200 BAULK LANE; CUST-ADDR(02); 5;SULLY; CUST-ADDR (03); 9;RINGSHIRE; CUST-ADDR(04) ;8;RF193CH; TEL-NR; 12; 037 581 4881; RCNT-ORD; 3; YES; CURR-FAULT; 2; NO; COMPLAINT; 2; NO; FU-RTNG; 1; D; EXCH-NM; 5; SULLY; LN(01); 75; 1 A10006 C EXCL EXCH LINE ON SOCKET 22.55; LN(02); 1; *; LN(03);75; 2 A10118 C STATESMAN TELE SC 4.00 8.00; LN(04); 1; *; DIS-BL-ID(01); 4; S003; DIS-BL-DTE (01); 8; 15/01/87; DIS-BL-AMT(01); 7; $308.00; DIS-BL-ID (02); 4; Q002; DIS-BL-DTE(02); 8; 30/12/86; DIS-BL-AMT (02); 7; $137.80; DIS-BL-ID(03); 4; i001; DIS-BL-DTE (03); 8;15/12/86; DIS-BL-AMT(03); 07; $137.80; END; 1;*

In this example, standard screen scraping would require eight message pairs=24 seconds Using MMBI this takes only one message pair=approx 4 seconds typically Updating It can be seen that updating either the mainframe or the PC client has been simplified by divorcing the physical information—e.g. which transaction, what data items, where on the screen image to find the data items—from the PC application. The PC application simply calls an "object". At the mainframe end, this physical location information is required, and it must be updated should the location of items on screens change. A file—the "map view"—is produced for screen changes put through the map generation process. This provides the link between the "external" message element and the "internal" (positionally dependant) application program view. In this way, every screen change which is introduced to the operational environment, is accompanied by it's own, new, "map view". This is accessed by the MMBI server 14 at run time, and thus changes to screens are automatically accommodated.

Although an interface device according to the present invention has been described for use in interfacing between a PC client and a mainframe computer system, it will be appreciated that it is equally suitable for interfacing between a mainframe client, or a client comprising for example a UNIX server (with LAN based PCs), to a mainframe computer system. Furthermore it will be appreciated that the communications link between the client and the mainframe may be serial, for example IBM 3270, or parallel, for example

What is claimed is:

1. An apparatus for providing an interface in a data management system between a plurality of application programs and one or more client programs, each application program using a device dependent message format and each client program using a device independent message format, wherein the interface is arranged to translate between each device independent message format and each device dependent message format, said interface comprising:

input means for receiving device independent messages containing a keyword from at least one of the client programs;

output means for sending device dependent messages to the application programs;

instruction storage means for storing one or more sets of instructions for translating between said device independent message formats and the device dependent message formats, each set of instructions being associated with a keyword and one or more sets of instructions being arranged to translate at least one of the device independent messages into a plurality of device dependent messages; and processing means operable in response to receipt of a message via said input means to identify the keyword in the input message and, in accordance with associated instructions from said instruction storage means, to translate a single device independent message conforming to a device independent format into an appropriate plurality of device dependent messages each conforming to respective device dependent formats, and to send the device dependent messages each conforming to respective device dependent formats to appropriate application program(s) via the output means so that the appropriate application program(s) can concurrently run multiple transactions using the device dependent messages each conforming to respective device dependent formats;

wherein any one of the application programs using a device dependent message format may be independently updated without affecting its ability to interact with any of the client programs using a device independent message format so that an application program can be updated without requiring a corresponding update to any of the client programs.

2. A data management system comprising:

a central computing resource having one or more application programs and an interface apparatus as in claim 1, and one or more client programs linked to the central computing resource via a communications link.

3. A system as in claim 2 wherein the central computing resource further comprises:

a dialogue manager for receiving requests for transactions from each client program and for sending results of transactions to each client program.

4. A system as in claim 3 wherein:

the dialogue manager is configured to pass any request from a client program comprising a device independent message to the interface apparatus, and to pass any request from a client comprising a device dependent message to the appropriate application program.

5. A system as in claim 2 wherein each device independent message comprises three parts separated by delimiters.

6. A system as in claim 5 wherein:

the three parts of the message have the characteristics of respectively Type, Length and Value.

7. A system as in claim 2 wherein:

the device dependent message contains data and information relating to display of the data on a display device.

8. A method of interfacing in a data management system between a plurality of application programs and one or more client programs, each application program using a device dependent message format and each client program using a device independent message format, wherein the method of interfacing includes steps to translate between each device independent message format and each device dependent message format, said method comprising the steps of:

(a) receiving device independent messages containing a keyword from one of the client programs;

(b) providing one or more sets of instructions for translating between each device independent message format and a device dependent message format, each set of instructions being associated with a keyword and one or more of the sets of instructions being arranged to translate at least one of the device independent messages into a plurality of device dependent messages; and (c) in response to the receipt of a message identifying a keyword in the input message and, in accordance with associated instructions, translating a single device independent message conforming to a device independent format into an appropriate plurality of device dependent messages each conforming to respective device dependent formats, and sending the device dependent messages each conforming to respective device dependent formats to the appropriate application program(s) so that the appropriate application program(s) can concurrently run multiple transactions using the device dependent messages each conforming to respective device dependent formats;

wherein any one of the application programs using a device dependent message format may be independently updated without affecting its ability to interact with any of the client programs using a device independent message format so that an application program can be updated without requiring a corresponding update to any of the client programs.

9. An apparatus as in claim 1 wherein the device independent message format comprises a first part and a second part, the first part defining one or more characteristics of the device independent message and the second part defining a keyword.

10. A method as in claim 8 wherein the device independent message format comprises a first part and a second part, the first part defining one or more characteristics of the device independent message and the second part defining a keyword.

11. An apparatus for providing an interface in a data management system between a plurality of application programs and one or more client programs, each application program using a device dependent message format and each client program using a device independent message format, wherein the interface is arranged to translate between each device independent message format and each device dependent message format, said interface comprising:

input means for receiving device independent messages containing a keyword from at least one of the client programs;

output means for sending device dependent messages to the application programs;

instruction storage means for storing one or more sets of instructions for translating between said device independent message formats and the device dependent message formats, each set of instructions being associated with a keyword and one or more sets of instructions being arranged to translate at least one of the device independent messages into device dependent messages; and processing means operable in response to receipt of a message via said input means to identify the keyword in the input message and, in accordance with associated instructions from said instruction storage means, to translate a single device independent message conforming to a device independent format into an appropriate plurality of device dependent messages each conforming to respective device dependent formats, and to send the device dependent messages each conforming to respective device dependent formats to appropriate application program(s) via the output means so that the appropriate application program(s) can concurrently run multiple transactions using the device dependent messages each conforming to respective device dependent formats;

wherein any one of the client programs using a device independent message format may be independently updated without affecting its ability to interact with any of the application programs using a device dependent message format so that a client program can be updated without requiring a corresponding update to any of the application programs.

12. A method of interfacing in a data management system between a plurality of application programs and one or more client programs, each application program using a device dependent message format and each client program using a device independent message format, wherein the method of interfacing includes steps to translate between each device independent message format and each device dependent message format, said method comprising the steps of:

(a) receiving device independent messages containing a keyword from one of the client programs;

(b) providing one or more sets of instructions for translating between each device independent message format and a device dependent message format, each set of instructions being associated with a keyword and one or more of the sets of instructions being arranged to translate at least one of the device independent messages into a plurality of device dependent messages; and (c) in response to the receipt of a message identifying a keyword in the input message and, in accordance with associated instructions, translating a single device independent message conforming to a device independent format into an appropriate plurality of device dependent messages each conforming to respective device dependent formats, and sending the device dependent messages each conforming to respective device dependent formats to the appropriate application program(s) so that the appropriate application program(s) can concurrently run multiple transactions using the device dependent messages each conforming to respective device dependent formats;

wherein any one of the client programs using a device independent message format may be independently updated without affecting its ability to interact with any of the application programs using a device dependent message format so that a client program can be updated without requiring a corresponding update to any of the application programs.

* * * * *